United States Patent [19]

Murakami et al.

[11] 4,400,610
[45] Aug. 23, 1983

[54] AUTOMATIC FILLET WELD TRACING MECHANISM

[75] Inventors: Masahiro Murakami; Kazuo Aotsuka, both of Amagasaki, Japan

[73] Assignee: Sumitomo Precision Products Company Limited, Amagasaki, Japan

[21] Appl. No.: 275,612

[22] Filed: Jun. 22, 1981

[30] Foreign Application Priority Data

Jul. 10, 1980 [JP] Japan ................................. 55-94587

[51] Int. Cl.³ ............................................. B23K 9/12
[52] U.S. Cl. ........................... 219/124.02; 219/124.34; 228/9
[58] Field of Search ...................... 219/124.34, 124.22, 219/124.02, 124.03; 228/8, 9

[56] References Cited

U.S. PATENT DOCUMENTS

| | | | |
|---|---|---|---|
| 3,694,621 | 9/1972 | Wofsey | 219/124.03 |
| 4,015,101 | 3/1977 | Hannappel et al. | 219/124.34 |
| 4,302,656 | 11/1981 | Poth et al. | 219/124.02 |

*Primary Examiner*—C. C. Shaw
*Attorney, Agent, or Firm*—Oblon, Fisher, Spivak, McClelland & Maier

[57] ABSTRACT

Disclosed is an automatic fillet weld tracing mechanism for two materials to be welded which are arranged stepwise and parallel to each other. A first motor driving mechanism is positioned at a fixed height and vertically reciprocates a first driven member having secured thereto a first sensor, said first sensor being positioned adjacent a first material to be welded with a given gap therebetween. A second driving mechanism is fixed to the first driven member and vertically reciprocates a second driven member to which is attached a second sensor held adjacent a second material to be welded with a given gap therebetween. The second driving mechanism also drives a third driving mechanism via a differential having a predetermined gear ratio. The third driving mechanism vertically reciprocates a third driven member having a welding torch attached thereto, the welding torch being positioned to weld at the gap between the materials. Control means are provided for actuating each of the first and second driving mechanisms in response to a change of the gap sensed by one of the sensors so that the torch is always held at a predetermined position relative to the gap, regardless of changes in the position of the gap.

4 Claims, 1 Drawing Figure

AUTOMATIC FILLET WELD TRACING MECHANISM

BACKGROUND OF THE INVENTION

1. Field of the Invention

The present invention relates to an automatic fillet weld tracing mechanism.

2. Description of the Prior Art

When fillet welding of materials is to be performed by arranging the materials to be welded in parallel and stepwise to each other (for example, lapping two sheets of plate or inserting a smaller size pipe into a larger pipe), irregular gaps often arise, due to working deformations or to thermal expansion caused by the heat of welding, between the materials to be welded. Therefore, the aiming spot of the welding torch is required to be changed whenever such a gap occurs. When the welding operation proceeds with a fixed aiming spot for the torch without so changing the aiming spot for the torch in accordance with the change of the condition of a gap, it is feared that the bead of the weld may be offset to either side of the materials to be welded or separately fused with each of the materials to be welded.

SUMMARY OF THE INVENTION

The present invention has as an object the provision of an automatic fillet weld tracing mechanism which automatically provides a certain given relative position for the changing gap between the materials to be welded. The mechanism uses a welding torch arranged so that its aiming spot is maintained through a motor driven mechanism which operates in accordance with a change of the gap determined by signals of proximity sensors arranged respective to the surfaces of the materials to be welded at places near to the fillet welding portion. The first proximity sensor, arranged close to the surface of the material to be fillet welded, with the other material arranged parallel and stepwise, is held with a given proximity gap adjacent the surface of the first material by way of a signal issued from the sensor, an amplifier and a motor driven mechanism. The motor driven mechanism of the second proximity sensor which is arranged with a given proximity gap to the surface of the other material to be welded in the same way as the first proximity sensor, is held on a supporting arm which is protrudingly installed to the reciprocated moving driven member of the first motor driving mechanism. A welding torch driving mechanism moves in relation with the motor driven mechanism of the second proximity sensor through a differential mechanism, making the welding torch move in dependence upon the displacement of the above second proximity sensor, but with a given ratio.

BRIEF DESCRIPTION OF THE DRAWING

Various other objects, features and attendant advantages of the present invention will be more fully appreciated as the same becomes better understood from the following detailed description when considered in connection with the accompanying drawings in which like reference characters designate like or corresponding parts throughout the several views, and wherein.

DETAILED DESCRIPTION OF THE PREFERRED EMBODIMENTS

Figure 1:
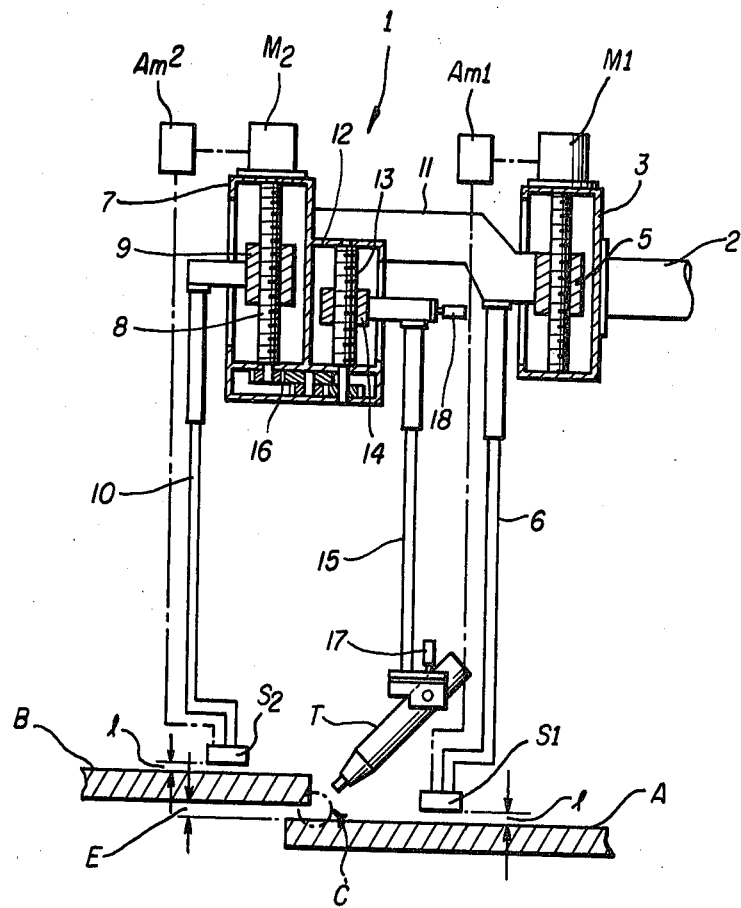
FIG. 1 is a drawing (partially sectional) showing a preferred embodiment of the invention.

Referring now to the figure, a detailed description of the automatic fillet weld tracing mechanism of this invention is given below.

FIG. 1 is a drawing of an embodiment of the automatic fillet weld tracing mechanism of this invention in which A and B are the materials to be welded, which are arranged in parallel and stepwise while C indicates a fillet weld portion and E indicates the gap between the materials to be welded.

The automatic fillet weld tracing mechanism of the preferred embodiment of this invention, shown generally at 1, is attached to a movable car (not indicated in the drawing) by way of an arm 2 to perform fillet welding while moving along the fillet welding line. Conversely, the automatic fillet weld tracing mechanism 1 could be fixed and the welding portion of the materials to be welded moved so as to perform fillet welding. A first proximity sensor $S_1$, is arranged close (sensing gap=1) to the surface of the material A to be welded and is linked to the reciprocally moving driven member 5 of the first motorized driving mechanism 3 through an adjustable length connecting rod 6. The first motorized driving mechanism 3 consists of a motor $M_1$, a screw rod 4 which is rotatably driven by the motor $M_1$, and a reciprocally moving driven member 5 which is engaged with the screw threads of the screw member 4. In this embodiment, the first motorized driving mechanism 3 is attached to a movable car (not shown) by way of the arm 2. The motor $M_1$ is moved by a signal of the proximity sensor $S_1$ through an amplifier $Am_1$ so as to displace the reciprocally moving driven member 5 and make the proximity sensor $S_1$ always maintain the given sensing gap relative to the surface of the material A to be welded. The second proximity sensor $S_2$, which is arranged close (sensing gap=1) to the surface of the material B to be welded is linked to the reciprocally moving driven member 9 of the second motorized driving mechanism 7. The second motorized driving mechanism consists of a motor $M_2$, a screw rod 8 rotatably driven thereby and the reciprocally moving driven member 9, by way of an adjustable length connecting rod 10, as in the case of the first proximity sensor $S_1$. The motor $M_2$ is operated by the signal of the second proximity sensor $S_2$ through an amplifier $Am_2$ so as to maintain the given sensing gap relative to the surface of the material B to be welded.

A supporting arm 11 is projectingly fixed to the reciprocally moving driven member 5 of the first motorized driving mechanism 3 of the first proximity sensor $S_1$, and to the second motorized driving mechanism 7 of the second proximity sensor $S_2$. A welding torch T, and a driving mechanism 12 to displace the welding torch T in relation with the second proximity sensor $S_2$, are attached to the second motorized driving mechanism 7 of the second proximity sensor $S_2$. A screw rod 13 of the driving mechanism 12 displaces the reciprocally moving driven member 14 by rotation of the screw rod 13 through a differential mechanism 16 consisting of a gear train driven by screw rod 8. Therefore, the welding torch T, attached to the driven member 14 by way of adjustable length connecting rod 15, is reciprocally displaced with a given ratio (for example ½ to ¼) depending upon the displacement of the second proximity sensor $S_2$ and the gear ratio of the differential 16.

The welding torch T is pivotally fixed to the distal end of the connecting rod 15. Fine adjustment of the position of the torch T in the longitudinal direction of the rod 15 is provided by adjusting screw 18 which adjusts the length of the rod 15, and fine adjustment of the angle of pivoting is provided by the adjusting screw 17.

The manner of operation of this embodiment of the automatic fillet weld tracing mechanism of this invention is explained below.

The first and the second proximity sensors $S_1$ and $S_2$ are positioned with a given sensing gap respective of the surfaces of materials A and B to be welded, and the welding torch T is set to the aiming spot of the fillet weld by adjusting the length, setting angle, etc., of the connecting rod 15. Fillet welding operation as normally performed, is implemented after the above setting and automatic tracing by the welding torch when distortions arise in the materials A and B to be welded due to the heat of the welding torch T during the welding operation will be explained hereunder. Suppose that a gap E arises due to the expansion of the material B to be welded, and the gap E grows as large as 5 mm. In this case, assuming that the ratio of the differential movement between the second motorized driving mechanism 7 and the driving mechanism 12 is set to $\frac{1}{2}$, the proximity sensor $S_2$ moves up by a distance corresponding to the increase in the gap E, or 5 mm, because the sensor $S_2$ operates so as to maintain the given sensing gap relative to the surface of the material B to be welded. The welding torch T on the other hand, moves due to the upward movement of the proximity sensor $S_2$, by a distance of 2.5 mm upwards resulting in the aiming spot of the torch T moving to the middle position of the gap E.

Suppose that the gap E is 5 mm, as above, and the material A to be welded expands by 3 mm to reduce the gap E to 2 mm. In this case the proximity sensor $S_1$ will rise 3 mm by following the deformation of the surface of the material A to be welded. Accompanying this rise, the second motorized driving mechanism 7, which is attached to the supporting arm 11 protrudingly attached to the reciprocally moving driven member 5 of the first motorized driving mechanism 3, is also raised for 3 mm. However, the proximity sensor $S_2$ will remain at its original position because it is operative to maintain the given sensing gap relative to the material B to be welded. Therefore, the sensor $S_2$ moves 3 mm lower relative to the driving mechanism 7. The welding torch T, which is arranged to move at a predetermined ratio, such as $\frac{1}{2}$, with the proximity sensor $S_2$, moves a distance of 1.5 mm lower. The movement of the above first and second sensors $S_1$ and $S_2$ and the welding torch T are expressed mathematically relative to the surface of the material to be welded A, as follows:

movement of $S_1$ : 3 mm (upward movement)
movement of $S_2$ : 5 mm + 3 mm − 3 mm = 5 mm
(holding the same position relative to B)
movement of T : 2.5 mm + 3 mm − 1.5 mm = 4 mm
(upward movement)

This indicates clearly that the aiming spot of the welding torch T is set at the mid point of the gap E (in this case E=2 mm), and good welding may be performed.

The operation of the tracing mechanism of the preferred embodiment of this invention has been described in two stages in relation with the deformation of materials A and B to be welded. However, the respective mechanisms begin to operate simultaneously with the signals issued from proximity sensors $S_1$ and $S_2$ and the movement is performed continuously to the given position.

As explained above, the automatic fillet weld tracing mechanism of this invention completely attains the object of tracing the displacement of the welding torch corresponding to the change of the gap between the materials to be fillet welded so as to automatically hold the aiming post of the welding torch always in a fixed relative position corresponding to a change of the gap (for example the mid point of the gap).

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An automatic fillet weld tracing mechanism for two materials to be welded which are arranged stepwise and parallel to each other, said mechanism comprising:
   first motor drive means having a fixed height and adapted to reciprocate a first driven means;
   a first sensor means fixed to said first driven means and positioned adjacent a first of said materials to be welded with a predetermined gap therebetween;
   first control means responsive to said first sensor means and adapted to control the actuation of said first motor drive means;
   second motor drive means fixed to said first driven means and adapted to reciprocate a second driven means;
   a second sensor means fixed to said second driven means and positioned adjacent a second of said materials to be welded with a predetermined gap therebetween;
   second control means responsive to said second sensor means and adapted to control the actuation of said second motor drive means;
   a third drive means, including means for actuating said third drive means at a predetermined ratio relative to the actuation of said second drive means, said third drive means being adapted to reciprocate a third driven means; and
   a torch fixed to said third driven means and positioned to weld at a predetermined point of a gap between said first and second materials to be welded,
   whereby a variation of said gap will cause said sensor means and control means to reciprocate said driven means such that said torch remains positioned to weld at said predetermined point.

2. The mechanism of claim 1 wherein said means for actuating said third drive means comprises a differential, with a predetermined gear ratio, connected between said second and third drive means.

3. The mechanism of claim 1 wherein each of said first and second control means comprises an amplifier connected between a corresponding sensor means and motor drive means.

4. The mechanism of claim 1, wherein said third driven means comprises an adjustable length rod having said torch pivotally connected to the distal end thereof, means for adjusting the length of said rod and means for adjusting the angle of said torch.

* * * * *